E. A. EMERY.
LUBRICATOR.
APPLICATION FILED FEB. 25, 1907.
907,228.
Patented Dec. 22, 1908.
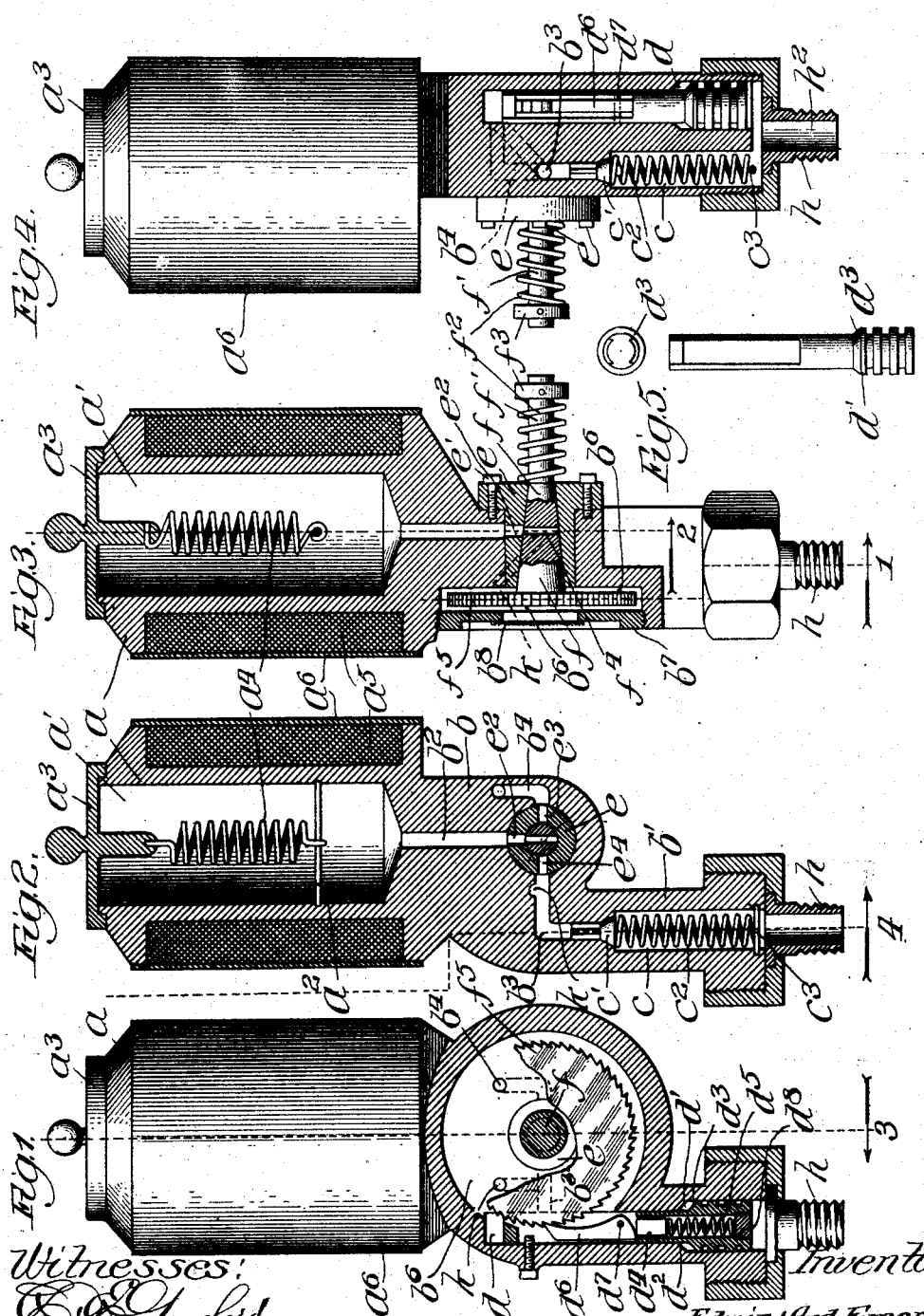
Witnesses:
Inventor:
Edwin Ard Emery,
By Thomas F. Sheridan,
Att'y

UNITED STATES PATENT OFFICE.

EDWIN ARD EMERY, OF CRIPPLE CREEK, COLORADO, ASSIGNOR TO THE EMERY PNEUMATIC LUBRICATOR COMPANY, OF DENVER, COLORADO, A CORPORATION OF COLORADO.

LUBRICATOR.

No. 907,228.  Specification of Letters Patent.  Patented Dec. 22, 1908.

Application filed February 25, 1907. Serial No. 359,251.

*To all whom it may concern:*

Be it known that I, EDWIN ARD EMERY, a citizen of the United States, residing in the city of Cripple Creek, county of Teller, and State of Colorado, have invented certain new and useful Improvements in Lubricators, of which the following is a specification.

My invention relates to new and useful improvements in lubricators designed to furnish lubricating material to the air end of "Westinghouse" or other air pumps on locomotives, though it is not limited in its application to such a purpose, since it is equally well adapted for lubrication of air compressors.

The object of my invention is to provide a lubricator which will furnish a constant carefully regulated supply of oil to the parts to be lubricated, which supply will not vary with the wear of the lubricator, and to provide means for regulating the rate of feed of the oil, whereby the oil is fed automatically and is not subject to the whim or caprice of the engineer operating the engine.

With these and other objects in view, my invention consists in the details and combinations hereinafter set forth and claimed.

In the accompanying drawings—Figure 1 is a side elevation of my improved lubricator partly in section on the line 1 of Fig. 3. Fig. 2 is a sectional view on the line 2 of Fig. 3. Fig. 3 is a sectional view on the line 3 of Fig. 1. Fig. 4 is a view partly in section on the line 4 of Fig. 2. Fig. 5 is a detail view of the piston operating the ratchet.

In carrying out my invention, I provide a casing comprising a solid casting having an upper cylindrical portion $a$, which is provided with an oil containing chamber $a'$. A bar $a^2$ extends across the lower portion of this oil chamber and a cap $a^3$ covers the upper end of this chamber. This cap $a^3$ is connected by a spring $a^4$ to the bar $a^2$. This spring thus serves to hold the cap securely in place and prevents its accidental removal, and at the same time causes the cap to be practically self-replacing. This cylindrical upper portion is recessed to receive an asbestos packing $a^5$ and a jacket $a^6$ serves to cover this packing and retain it in place. This packing material, which is made—as above stated—of asbestos, or other non-conducting material, is intended to preserve the cylinder oil commonly used for lubricating purposes from becoming stiff with the cold. The oil is heated by the heat of compression which is transmitted upward through the solid casting or body portion of the lubricator to the cylindrical reservoir.

The lower portion of the casting comprises an intermediate portion $b$ and an extension $b'$. The intermediate portion $b$ is provided with a bore or passageway $b^2$ communicating with the lower end of the oil chamber, and this intermediate portion is bored transversely to receive a bushing $e$, this bushing being secured to the intermediate portion by suitable screws or fastening devices $e'$. The bushing extends transversely through the intermediate portion and is bored interiorly with a conical bore. This bushing is also provided with passageways $e^2$, $e^3$, $e^4$ arranged at right angles to each other, for a purpose presently to be described. The bushing $e$ contains a rotating conical-shaped valve $f$, which is provided with a stem or extension $f'$ extending outside the casting. This extension is surrounded by a spring $f^2$ which bears against the bushing $e$ and against the collar $f^3$ adjacent the end of the extension. Thus, the rotating valve is kept to its seat and in register with the various ports. The rotating valve is provided at an intermediate point with a passageway $f^4$, which is adapted to be brought into register with the ports or passageways $e^2$, $e^3$, $e^4$ as the valve is rotated.

The lower extension $b'$ of the casting is provided with two chambers $c$ and $d$, and at its lower end the casting is provided with a screw threaded extension $h$ containing a passageway $h^2$. By means of this extension the lubricator is connected to the air end of the "Westinghouse" air pump or to the other parts to be lubricated. Connecting the chambers $c$ to the passageway $e^4$ is a passageway $b^3$, and a check valve $c'$ is mounted in the lower end of the passageway $b^3$, this check valve being normally held to its seat by a spring $c^2$ supported upon a bar $c^3$ in the lower end of the chamber $c$. The inner end of the rotating valve is provided with a ratchet wheel $f^5$ mounted in a chamber $b^6$ formed in the intermediate portion of the casting at the side thereof. This chamber $b^6$ is closed by a screw threaded plate $b^7$ provided with a central opening which is covered with a sheet of gauze, or other material, $b^8$, through which air is supplied to the interior of the valve and the passageways.

The chamber $d$ of the lower extension of the casting contains a piston $d'$ formed at its lower end with inclined shoulders $d^3$ which seat against corresponding inclines $d^2$ in the chamber in the manner of a valve. This piston is hollowed out interiorly, and in the upper end thereof is a sliding block $d^4$ which rests upon a spring $d^5$ supported upon a screw-threaded block $d^8$ in the lower end of the piston. In the upper portion of the piston is pivoted, at $d^7$, a pawl $d^6$, the heel of this pawl being in contact with the sliding block in the piston. This pawl engages at its upper end the ratchet teeth of the ratchet $f^5$. At its lower end the chamber $d$ also communicates with the passageway $h^2$.

The operation of my lubricator may now be understood. The piston is reciprocated by the alternate pressure and vacuum created in the cylinder of the air pump—that is, as the air pressure is generated in the upper end of the air cylinder the piston will be moved upwardly, thus carrying the pawl $d^6$ upward and causing the rotation of the ratchet and the valve connected therewith one step. As the ratchet is rotated, the passageway $f^4$ in the rotating valve is brought alternately into alinement with the oil passageway $b^2$ and with the passageway $e^4$. When the passageway $f^4$ is in alinement with the oil passageway $e^2$ a supply of oil from the oil chamber is fed to the valve passageway. Upon rotation of the valve this oil will be drawn through the passages $e^4$, $b^3$, past the check valve $c'$, and down into the upper portion of the air cylinder and to the parts to be lubricated. The quantity of oil fed to the parts to be lubricated is dependent upon the size of the passageway in the rotating valve stem, and also upon the speed of rotation of this valve stem, it being evident that the greater the number of strokes of the air pump the greater will be the quantity of oil fed thereto. The passageway $b^4$ communicates with the chamber $d$ and with the passageway $e^3$ in the bushing. Thus, the air is drawn through this passageway $b^4$ and the passageway $e^3$ into the chamber $c$ carrying with it the oil.

In order to provide a further supply of air to the passageway $b^3$ I show an auxiliary passageway $k$ communicating with the passageway $b^3$ and with the chamber $b^6$. This auxiliary passageway supplies air to the passageway $b^3$ on each downward stroke of the pump, thereby preventing accumulation of oil in the passageway $b^3$, which would be the case were it not carried down on each succeeding downward stroke. This auxiliary passageway also serves the additional function of preventing the air, which would escape on the upward stroke of the pump due to the failure of the check valve $c'$ to seat properly, from blowing oil out of the passageway $f^4$ backward through the passageway $e^3$ and into the ratchet case from which air to both passageways is drawn.

It is believed that the operation of my lubricator will be understood without further description. It will be seen that I have provided a lubricator in which a constant predetermined quantity of oil is fed to the parts to be lubricated as often as may be necessary to insure the proper lubrication thereof. I also provide a lubricator which insures against the possibility of the pump or compressor being flooded with oil, due to the negligence on the part of the operator in not shutting off the oil supply. The adjustment of the feed is made by the air brake department, after experiments as to what is the necessary amount for the pump to have, and the feed cannot be altered by any one save the person in charge of that particular duty.

I claim:

1. In combination with an air pump, a lubricator comprising a body portion having an oil-containing chamber, said body portion also having passageways communicating with the oil-containing chamber and with the air end of the air pump, and having also a second set of passageways communicating with the atmosphere and with the air end of the pump, a rotating oil feeding valve interposed in the passageways between the oil-containing chamber and the pump, a check valve in the passageway between the oil feeding valve and the pump, said check valve being adapted to open toward the pump, a ratchet wheel secured to said oil feeding valve, a pawl pivoted adjacent the ratchet wheel, and a piston mounted in the second set of passageways for operating said pawl and ratchet wheel.

2. A lubricator for air pumps and the like, comprising a body portion provided with an oil containing chamber, a passageway therefrom to the pump, a valve member with a chamber therein adapted to receive oil from the oil containing chamber in one position and to deliver it to the passage to the pump in another position, and a branch passage opening at all times to the external air between the said valve member and the pump.

3. A lubricator for air pumps and the like, comprising a body portion having an oil containing chamber, a passage therefrom to the pump, a valve member in said passage, a branch to the external air adjacent to said valve member, and another branch to the external air between the said valve member and the pump, said last named branch being adapted to permit an inflow of air therethrough.

4. A lubricator for air pumps and the like, comprising a body portion having an oil containing chamber, a passage therefrom to the pump, a bushing transverse to said passage, a tapered opening in the bushing, a tapered valve member in said opening, a spring adapted to hold the valve member in the bushing, a transverse opening through the tapered valve member, openings through the side walls of the bushing with which said transverse opening is adapted to successively register, and means actuated by the varying air pressure in the pump for rotating said valve member.

5. A lubricator for air pumps and the like, comprising a body portion having an oil containing chamber, a passage therefrom to the pump, a valve member in said passage, a piston chamber also in said body portion, a ratchet wheel on said valve member, said ratchet wheel being in a recess in the body portion, a pawl on the piston engaging the ratchet wheel, and a screen to cover said recess.

EDWIN ARD EMERY.

Witnesses:
 THOMAS F. SHERIDAN,
 LAU D. SWEET.